United States Patent [19]

Guillaume et al.

[11] Patent Number: 5,219,918
[45] Date of Patent: Jun. 15, 1993

[54] COPOLYMER COATING COMPOSITIONS COMPRISING SULFOALKYL MONOMERIC EMULSIFIER

[75] Inventors: Jean-Luc Guillaume, La Wantzeneu, France; Veli J. Koskelainen, Helsinki, Finland

[73] Assignee: The Dow Chemical Company, Midland, Mich.

[21] Appl. No.: 813,539

[22] Filed: Dec. 26, 1991

Related U.S. Application Data

[63] Continuation of Ser. No. 260,170, Oct. 20, 1988, abandoned.

[51] Int. Cl.$^5$ .................. C08K 3/00; C08K 5/00
[52] U.S. Cl. ............................ 524/547; 526/240; 526/287
[58] Field of Search ............ 526/287, 240, 251, 293; 524/547

[56] References Cited

U.S. PATENT DOCUMENTS 4,436,875 3/1984 Janiga.

FOREIGN PATENT DOCUMENTS 842563 7/1960 United Kingdom.

Primary Examiner—Christopher Henderson

[57] ABSTRACT

The use of a sulfoalkyl monomer in monovinylidene aromatic/(meth)acrylate/(meth)acrylic acid monomer latexes has been found to provide surprisingly good combinations of ion stability and moisture resistance. This is shown to be especially beneficial in paper coating and paint formulations. In examples, sulfopropyl methacrylate has proven especially beneficial in a styrene/n-butylacrylate/methacrylic acid latex for use in industrial-type, high strength coatings and formulations for coating offset printing paper.

9 Claims, No Drawings

COPOLYMER COATING COMPOSITIONS COMPRISING SULFOALKYL MONOMERIC EMULSIFIER

This application is a continuation of copending application Ser. No. 260,170 filed Oct. 20, 1988, now abandoned.

This invention relates to improved coating compositions based on (meth)acrylate and acid monomers further comprising an emulsifying, sulfoalkyl monomer polymerized therein. Optionally, the polymer can also contain monovinylidene aromatic monomers. Preferably these are prepared as aqueous dispersions and comprise a sulfoalkyl acrylate.

Aqueous dispersions of polymers (i.e., latexes) find wide spread usage as coatings and particularly in the areas of paper coatings, paints, and other types of protective or ornamental coatings. It is well known in the art that emulsifiers or surfactants must be added to achieve stable, aqueous dispersions of the polymeric material. It is also known that certain monomers having hydrophilic moieties can be used in preparing the polymer and will assist in emulsifying and stabilizing it in an aqueous dispersion. See, for example DE-A-2,160,381 and DE-A-2,213,756. In these references (meth)acrylamide monomer, optionally partially replaced by sulfoalkyl acrylate monomers, is used to prepare styrene-(meth)acrylate polymer dispersions according to the processes claimed therein. It has been found, however, that in addition to the toxicity problems resulting from residual acrylamide and methacrylamide, the polymers of the type described will typically decrease in moisture resistance if the ion stability is improved and vice-versa. This trade off between ion stability and moisture resistance is even more pronounced in the traditional soap/surfactant stabilized dispersions.

GB 1 489 494 teaches the use of sulfoacrylamido monomeric emulsifiers in the polymerization of pressure sensitive adhesive acrylate-based polymers. A broad range of unsaturated sulfonic acids and derivatives are taught in GB 2 175 594 to improve various properties of (meth)acrylate latexes to be used for the latex modification of concrete. In U.S. Pat. No. 3,617,368 vinylidene chloride-type polymer latexes are taught to have improved barrier, flexibility, heat seal and binding properties by the use of a sulfoalkyl-type monomer and a hydrophilic (e.g., acid) monomer.

It is an object of the present invention to provide (meth)acrylate polymer compositions which have good ion stability in aqueous dispersion form and form coatings having good resistance to abrasion, moisture, corrosion and light. It is another object to provide aqueous polymer dispersions suitable for use in preparing coating formulations having the above desirable properties. It is a further object to provide the coating formulations, coatings and coated articles that can be prepared.

In this regard, polymer compositions are prepared according to the present invention having simultaneously improved combinations of ion stability in their aqueous dispersion form and moisture resistance when used to prepare coating films. This in turn leads to improved coating properties in the areas of gloss and/or corrosion resistance. In one aspect the present invention is a (meth)acrylate polymer composition comprising in polymerized form (a) from 0 to 90 parts by weight of at least one monovinylidene aromatic monomer, (b) from 9 to 99 parts by weight (meth)acrylate monomer(s), (c) from 0.2 to 6 parts by weight of at least one ethylenically unsaturated carboxylic acid and (d) from 0.5 to 5 parts by weight of at least one sulfoalkyl surfactant monomer of the formula I:

$$H_2C=C(R_1)-C(O)-O-R_2-SO_3-M \qquad I$$

wherein $R_1$ is —H or a methyl radical, $R_2$ is a bivalent hydrocarbyl radical having 1 to 5 carbon atoms and M is a salt-forming cation, said weight parts being based on 100 weight parts (a), (b), (c) and (d).

In another aspect the invention is also an improved aqueous polymer dispersion suitable for use in preparing improved coating formulations and coatings. In a further aspect, the invention relates to improved coatings, coating formulations and coated objects.

The polymers according to the present invention can be prepared by polymerization processes which are generally known in the art, and particularly by the known latex polymerization processes. Representative processes include those described in U.S. Pat. Nos. 3,575,913 and 3,563,946 and German Patent Publication 1,905,256 which are incorporated herein by reference. Such processes can be adapted as necessary to polymerize the polymers of the above described monomers based on the generally known principles of latex polymerization. The well known latex polymerization aids such as initiators, chain transfer agents, crosslinking agents, surfactants, emulsifiers, seed latex materials and the like can be used as needed.

The polymerizable sulfoalkyl surfactant or emulsifying monomer(s) which are suitable for use according to the present invention are represented by the formula:

$$H_2C=C(R_1)-C(O)-O-R_2-SO_3-M \qquad I$$

wherein $R_1$ is —H or a methyl radical, $R_2$ is a bivalent hydrocarbyl radical having 1 to 5 carbon atoms and M is a salt-forming cation. These monomers are generally known in the art. See for example GB Patent 842,563; JP 77-001,733 and DE 3,440,790.

The use of these monomers in the specific polymers according to the present invention as defined above has been shown to produce coating compositions which have excellent combinations of ion stability, wet adhesion to substrates, and resistance to moisture, light and corrosion in film form as compared to the coating compositions which are currently known using non-polymerized emulsifiers and/or alternative polymerizable emulsifier components such as acrylamide monomer. It has been found especially preferable to use monomers according to the above formula wherein $R_2$ has 1 to 3 carbon atoms and $R_1$ is a methyl radical. It is especially preferable to use a sulfoalkyl monomer wherein $R_2$ is a gem. propyl group wherein both valences are on the second carbon of the propyl group. Regarding M, the alkali and/or alkali earth metals are preferred salt forming cations, with sodium, potassium, or calcium being especially preferred.

These sulfoalkyl surfactant monomers should be used in minor amounts of from 0.5 to 5 weight parts based on 100 weight parts of the monomers used to form the main portion of the polymer. It has been found preferable to use from 0.5 to 3 weight parts, more preferably from 1 to 3 weight parts, and most preferably from 1 to 1.5 weight parts.

In preparing the base polymer composition, one or more of the monovinylidene aromatic monomers which are generally known in the art are used. As used herein, the term monovinylidene aromatic monomer refers to compounds represented by the formula II below:

$$Ar—C(R_3)=CH_2 \qquad \qquad II$$

wherein Ar is phenyl or phenyl substituted with halogen and/or one more hydrocarbyl radical(s) having 1 to 4 carbon atoms and $R_3$ is —H or a 1- to 4-carbon alkyl group. Preferred examples of such monomers include alpha methyl styrene and ortho-, meta- and/or paravinyl toluene, with styrene being the most preferred monovinylidene aromatic monomer.

The polymer compositions according to the present invention also comprise in polymerized form (meth)acrylate monomer(s). As used herein this refers to alkyl esters of acrylic and/or methacrylic acid wherein the alkyl group(s) have from 1 to 20 carbon atoms. These monomers are generally known for the preparation of latex polymers and are represented by the formula III below:

$$CH_2=C(R_4)—C(O)—O—R_5 \qquad \qquad III$$

wherein $R_4$ is —H or a methyl radical and $R_5$ is a straight or branched chain alkyl radical having from 1 to 20 carbon atoms. Preferably, $R_5$ contains from 2 to 8 carbon atoms, more preferably 4 to 8, with $R_5$ most preferably being n-butyl and/or ethylhexyl radicals. $R_4$ is preferably —H and preferred monomers include n-butyl acrylate and ethylhexyl acrylate, with n-butyl acrylate being most preferred.

The polymers according to the present invention also contain polymerized therein a minor amount of at least one ethylenically unsaturated carboxylic acid monomer. This includes the well known polymerizable acid monomers such as itaconic, fumaric, acrylic and/or methacrylic acids, the use of which in latex polymerizations is generally well known. It has been found that the use of methacrylic and/or acrylic acids, referred to herein as (meth)acrylic acid(s), in combination with the sulfoalkyl monomer provides unexpectedly good combinations of ion stability for the aqueous dispersions and gloss, corrosion resistance and moisture resistance for the films/coatings prepared therefrom. Normally, with the prior art dispersions, when one of these properties is benefited, one or more of the others is reduced. The use of methacrylic acid is especially preferred since it has surprisingly been found to provide the most improved combinations of coating properties and ion stability in these coating polymers.

The monovinylidene aromatic and (meth)acrylate monomers are selected and used in amounts necessary to prepare a desired coating polymer which is then given surprisingly improved dispersion stability and physical properties by the copolymerization therewith of the (meth)acrylic acid and sulfoalkyl emulsifying monomers. It is preferable to select the monovinylidene aromatic and (meth)acrylate monomers such that their resultant polymer composition would have a glass transition temperature of between −30° C. and +100° C., preferably between −30° C. and +40° C., more preferably between 0° C. and +30° C., as measured by differential thermal analysis.

In preparing this polymer, the monovinylidene aromatic monomer(s) are typically used in amounts of 0 to 65 preferably 0 to 70, more preferably 20 to 60, and most preferably 40 to 50 parts by weight; the (meth)acrylate(s) in amounts of 9 to 99, more preferably 38.5 to 78.5, and most preferably 48 to 58 parts by weight; and the (meth)acrylic acid(s) in amounts of 0.2 to 6, more preferably 0.5 to 3, and most preferably 1 to 2 parts by weight. These weight parts are based upon 100 parts by weight of the monovinylidene aromatic, (meth)acrylate, (meth)acrylic acid and sulfoalkyl monomers in the final polymer.

It is also possible to include additional, minor amounts of one or more ethylenically unsaturated monomer in the preparation of the polymers according to the present invention. Such monomer(s) could include unsaturated aliphatic nitriles, such as acrylonitrile or methacrylonitrile; and/or vinyl and/or vinylidene chloride. However, these monomers would be used only in minor amounts, generally less than 30, preferably less than 20 and most preferably less than 10 parts by weight based upon 100 parts by weight of the polymer into which they are polymerized. As mentioned above, acrylamide monomer should not be included in the polymer compositions according to the present invention. To the extent that similar toxicity problems and/or the property trade-offs are encountered, it is preferred that the acrylamide-type monomers should also be avoided. The monomers selected for the preparation of the polymers according to the present invention should in any event provide a resultant polymerized composition having a glass transition temperature of between −30° C. and +100° C., preferably between −30° C. and +40° C., more preferably between 0° C. and +30° C., as measured by differential thermal analysis.

As compared to coating compositions and coatings prepared from the known polymeric coating materials, those containing the polymer compositions according to the present invention are surprisingly stable in their dispersion form, adhere well to substrates when applied as an aqueous dispersion, and result in coatings with improved gloss and moisture, corrosion and light resistance. In the areas of paints, industrial coatings, and the like, these are obviously highly advantageous property combinations and not obtained from currently available latexes. The formulated coating materials will have good shelf lives, the applied coating will adhere strongly to the metal or other types of substrate materials and the protective coating will be highly resistant to moisture and the salt solutions often encountered by the coated surfaces. With regard to paper coatings, the toughness and water resistance of the coating materials are very advantageous in view of the treatments which the coated paper receives in offset and other printing processes.

Depending on the intended use of the polymer composition prepared according to the present invention various other additives and ingredients known to those skilled in the respective arts can be incorporated to prepare coating compositions. It should be noted, however, that the additional surfactants and/or emulsifiers typically required for using the known polymeric coating materials are either unnecessary or can be reduced greatly in amount to achieve similar levels of dispersion stability. The high levels of emulsifiers and/or surfactants which are used to make the currently available dispersions ion stable, contribute greatly to the poor moisture resistance observed in the coatings.

Typical ingredients for paper coatings, also called coating colors, could include pigments such as kaolin, calcium carbonate, talc, gypsum, titanium dioxide, montmorillonite, and/or bentonite; dispersing agents such as polyacrylate, pyrophosphate, and/or hexamethylphosphate; defoamers; optical brightening agents; release agents; cobinders; and/or synthetic thickeners.

Typical paint and/or industrial coating formulations would include coating fillers such as calcium carbonate, talc and/or kaolin; pH buffers; defoamers; fungicides; and/or pigments such as titanium oxide, iron oxide and zinc phosphate.

The present invention can be further illustrated by the following experiments. Unless otherwise specified, all amounts are in parts by weight and temperatures in °C.

To prepare the sample compositions described and evaluated in the following TABLES, the amounts of monomers as indicated in the TABLE were fed continuously to a heated, agitated latex polymerization vessel which had been purged with nitrogen. Initially, the vessel was supplied with distilled water, Versenol 120 brand chelating agent (0.02 weight parts), and a styrene polymer latex (0.1 weight parts based on monomer) with an average particle size of 30 nanometers. Upon heating the contents to a temperature of 90° C., the feeds were started and supplied over 4 hours. One of the feed streams was an aqueous feed stream containing 0.2 weight parts of ammonium persulfate initiator. The indicated amount of the sulfoalkyl monomer is supplied in a separate aqueous stream. The remaining monomers in the amounts indicated are added as a separate feed stream to the polymerization vessel. Versenol is a registered trademark of The Dow Chemical Company.

During the 4 hour feeding and polymerization time the temperature of the reaction mixture was maintained at 90° C. Afterwards, the temperature was then maintained at 90° C. for a 90 minute cook-down period. At this time the solids level was about 50 percent. The latex pH is adjusted from 6 to 9 with ammonia to achieve the desired viscosity. Except where otherwise indicated, the latexes had a uniform average particle size as measured by light scattering of about 0.14 micrometer.

In the TABLES, the indicated latex viscosities are given in milliPascal seconds (mPa.s) and are measured at a latex pH of 8 using a Brookfield Viscometer with spindle 4 at 100 r.p.m. The minimum film forming temperature (MFFT) of the latex is given in °C. The water absorption of the films (Water Absorb.) is tested by soaking a film having a thickness of about 150 micrometer ($\mu$M) in distilled water at room temperature and measuring the percentage weight gain which is attributable to absorbed water. Except where otherwise indicated, the mechanical stability (Mech. Stab.) test was done at a latex pH of 3. In this test the latex is stirred at high speed on a Hamilton Beach brand mixer for thirty (30) minutes. If the latex remained stable for the full time it passed the test. If it coagulated sooner, this number of minutes required is given.

The cement stability evaluation (Cem. Stab.) was done by mixing 33 weight parts latex and 66 weight parts Portland cement and noting the amount of time in hours required before the mixture dries out, and/or becomes extremely viscous. This test is very commonly used in the industry to give a preliminary prediction of the ion stability of paint formulations prepared with various latex polymer compositions. The cement composition is used to represent the ionic filler materials in high concentrations in paint formulations.

The wet film haze values (Haze) given in the tables are visually measured by on a film having a thickness of 150 micrometers. The measurements range from 0 for clear film to 6 for a white film. A film prepared of Acronal 290D brand latex is used as a reference point, giving a value of 3. Acronal 290 D (trademark) is commercially available from BASF, Germany and is standard, commonly used paint formulating latex.

The paint properties given in Table I are tested on paint formulations as described below. The term "PVC" refers to "pigment volume content" as given in weight percent.

| Paint Formulations | | Primer | Top Coat |
|---|---|---|---|
| Water | | 125 | 85 |
| Borchigel DP-40 | (Thickener) | 3 | 3 |
| Dispex A40 | (Dispersing Agent) | 4 | — |
| Byk-040 | (Defoamer) | 1 | 1 |
| Dowicil 75 | (Preservative) | 1 | 1 |
| Ammonia (25%) | (pH Adjustment) | 4 | 2 |
| Tiona 535 | (TiO$_2$ pigment) | 80 | 200 |
| Micro Mica | (Filler) | 70 | — |
| Sicor ZNP-S | (Zinc phosphate pigment) Disperse for 20 min, then add: | 150 | — |
| Water | | 97 | 37 |
| Latex (as shown in TABLE I) | | 400 | 600 |
| Borchigel DP-40 | | 10 | — |
| Ethylene glycol (Coalescing Aid) | | 35 | 40 |
| Propylene glycol (Cosolvent) | | 10 | 20 |
| Aerosol OT-75 (Surfactant) | | 2 | 2 |
| NaNO$_2$ (25%) (Flash Rust Inhibitor) | | 8 | 8 |
| Byk-040 | | 2 | 2 |
| PVC (%) | | 34 | 15 |
| Solids | | 51 wt. % | 50 wt. % |
| | | 35 vol. % | 40 vol. % |
| Density (kg/dm$^3$) | | 1.26 | 1.21 |
| pH | | 7.5 | 7.5 |
| Viscosity | | 3,000 | 10,000 |
| (mPa · s, Brookfield RVT) | | (4/20 rpm) | 5/20 (rpm) |

In the above described formulation Borchigel DP-40 is a trademark of Gebr. Borchers, Germany; Dispex A40 is a trademark of Allied Colloids, U.K.; Byk-040 is a trademark of Byk-Chemie, Germany; Tiona 535 is a trademark of Laporte, U.K.; Micro Mica is a trademark of Norwegian Talc, Norway; and Aerosol OT-75 is a trademark of American Cyanamid. The paints formulated as described above were applied to a clean, cold rolled steel substrate as a 30–40 $\mu$M thick primer coat and a 30–40 $\mu$M thick top coat. As can be seen in the following TABLE I the paint formulations using polymer compositions according to the present invention using the latex prepared in Experiment No. 4 described above, are clearly superior to the formulations prepared using the coating polymers currently known.

The salt spray resistance evaluation is done according to DIN 50021 and is reported in Table I as "Salt Fog", indicating the number of hours in the salt spray before corrosion starts. The gloss is measured in % according to DIN 67530. The wet adhesion (after 24 hours soaking in distilled water) and the dry adhesion are measured according to ASTM D 3359-78, the results being indicated on a scale of 1 to 5 with 1 being very poor and 5 being excellent.

The following abbreviations are used in the TABLES: BuAc is n-butul acrylate, EHA is ethylhexyl acrylate, Sty is styrene, MA is methacrylic acid, AA is acrylic acid, SPM is sulfopropyl methacrylate, and SEM is sulfoethylmethacrylate.

TABLE I

| | Experiment No. | | | | | | | | | | |
|---|---|---|---|---|---|---|---|---|---|---|---|
| | 1* | 2* | 3* | 4* | 5* | 6 | 7 | 8 | 9 | 10 | 11 |
| MONOMERS | | | | | | | | | | | |
| BuAc | 50 | 50 | 50 | 50 | 50 | 50 | 50 | — | — | 50 | 50 |
| EHA | — | — | — | — | — | — | — | 35 | 35 | — | — |
| Sty | 47 | 47 | 48.5 | 46.5 | 46 | 46.5 | 46 | 61.5 | 61.5 | 46.25 | 47.5 |
| MA | — | 3 | — | 2 | — | 2 | — | 2 | — | 1 | 1 |
| AA | 3 | — | — | — | 2.5 | — | 2.5 | — | 2.5 | 2 | .1 |
| SULFO | 0** | 0** | | | | | | | | | |
| SPM | — | — | 1.5 | 1.5 | 1.5 | — | — | 1.5 | 1.5 | 0.75 | 0.5 |
| SEM | — | — | — | — | — | 1.5 | 1.5 | — | — | — | — |
| PHYSICAL PROPERTIES | | | | | | | | | | | |
| Mech. Stab. (min) | 4 | 1 | 30 | 30 | 15 | 30 | 12 | 30 | 30 | 30 | 30[1] |
| Cem. Stab. (Hr) | 0 | 0 | 0 | 4 | 3 | 4 | 3 | 4 | 3 | 3 | 1.5 |
| Haze | 2 | 2 | 2 | 0 | 1 | 1 | 2 | 0 | 1 | 0 | 1 |
| Water Absorb. (%) | 9 | 7 | 4.2 | 5.5 | 8 | 6.5 | 11 | 4 | 6.5 | 6 | 5 |
| Viscosity (mPa · s) | 220 | 150 | 1200 | 1100 | 950 | 750 | 2200 | 700 | 8500 | 3700 | 225 |
| MFFT (°C.) | 16 | 16 | 16 | 16 | 16 | 16 | 16 | 11 | 11 | 16 | 16a |
| Particle Size (μM) | | | | | | | | | | 0.17 | 0.21 |
| PAINT PROPERTIES* | | | | | | | | | | | |
| Gloss | 42 | — | 57 | 75 | 68 | 52 | 51 | 40 | 21 | — | — |
| Salt Fog | 50 | — | 50 | >500 | 240 | | | | | | |
| Dry Adhesion | 4 | — | 4 | 5 | 5 | | | | | | |
| Wet Adhesion | 2 | — | 1 | 1 | 4 | | | | | | |

*Comparative experiment, not an example of the present invention.
**In order to achieve sufficient stability anionic surfactant is used in the polymerization (0.75 parts).
***In order to achieve sufficient ion stability to formulate into paints, the latexes of Comparative Experiments 1, 2 and 3 required the addition of further amounts of nonionic surfactants.
[1]The latex pH was 7.5 for the mechanical stability test.

To illustrate the suitability of the polymer compositions prepared according to the present invention for paper coating applications, two paper coating pigment compositions were prepared. Pigment composition A comprised 100 parts of SPS clay (commercially available from and a trademark of English China Clay, U.K.) dispersed in a slightly alkali aqueous solution of 0.1 weight parts sodium polyacrylate and 0.2 weight parts sodium methaphosphate as dispersants. Pigment composition B was prepared similarly using 40 parts of the same clay and the same amounts and types of dispersants in combination with 60 parts by weight of a calcium carbonate slurry commercially available as Hydrocarb 90 (trademark) from Pluss Stauffer.

To these pigment compositions were added 0.6 parts by weight synthetic polymer thickener commercially available as XZ 86490 from The Dow Chemical Company, 0.5 parts by weight Bacote 20 (trademark) ammonium zirconium carbonate cross-linking agent commercially available from Magnesium Elektron, U.K. and 10 parts by weight latex solids of a latex polymer of the indicated composition. The pH was adjusted to 8.5 by the addition of sodium hydroxide. The resulting paper coating formulations then contained 60 percent by weight solids and had a viscosity of approximately 1100 milliPascal seconds (pigment A) or 650 milliPascal seconds pigment (B) as measured by a Brookfield viscometer RVT at a speed of 100 rpm.

Each of the formulations was coated onto an 84 gram per square meter wood-free base paper using a conventional blade coating technique to produce a coating weight of 14 grams per square meter (dry coating weight). The paper was then passed through a calendar using nip rollers at a temperature of 60° C. and a pressure of 100 kilonewtons per meter.

The wet and dry pick resistances of these coated papers were then tested. The standardized TAPPI test method was used to determine dry pick resistance by measuring the distance along the printed surface until picking occurred, higher numbers indicating better coatings.

The wet pick resistance was measured using a standard Prufbau testing apparatus and standard Huber inks under the following testing procedure. Two standard paper test strips were used. On the first a strip of water was applied to the middle (area B) and the edges (area A) remained dry. This was then printed with ink on the Prufbau apparatus. The wetted portion, area B, had less ink density due not only to the fact that parts of the water-weakened coating "picked" off but also due to the fact that the wetted paper partially refused the ink compared to the dry paper. Immediately after the first strip was printed, the second, completely dry test strip was printed on the Prufbau apparatus in the same way without drying, cleaning or re-inking the printing surface.

The ink density in the second strip was different at the edges (area C) than in the middle (area D). This is because, compared to the printing of the edges, the printing surface which contacted the second strip in the middle area D, after printing the first, partially wetted strip still had (a) portions of wet-picked coating removed from area B, (b) water that was removed from printing area B, and also (c) extra ink which was refused when area B was printed. The ink density was measured by standard reflected light intensity means and average density values were obtained for areas A, B, C and D. These values were then used in the following relationships to calculate the value for wet pick resistance:

$$X(\text{ink transfer in \%}) = (B/A) \times 100$$

$$Y(\text{ink refusal in \%}) = \{[100D - (X \times C)]/100A\} \times 100$$

$$Z(\text{wet pick in \%}) = 100 - X - Y$$

As can be seen from these equations, a high value for X indicates good printability, a low value for Y indicates low levels of ink refusal and low values of Z indicate good wet pick resistance. The results of these tests on the papers coated with the various coating color formulations are shown below in the TABLE II.

As indicated in TABLE II below, the polymer compositions according to the present invention provide very desirable paper coating compositions. As can be seen, the sulfoalkyl monomer produces surprisingly good combinations of wet and dry pick resistance for polymer compositions containing either acrylic or methacrylic acid.

TABLE II
PAPER COATINGS

| | Experiment No. | | | |
|---|---|---|---|---|
| | 12* | 13 | 14* | 15 |
| Monomeric Components of Latex** | BuAc Sty AA | BuAc Sty AA SPM (Expt. 5) | BuAc Sty MA | BuAc Sty MA SPM (Expt. 4) |
| Pigment Composition A | | | | |
| Dry Pick | 49 | 55 | 53 | 62 |
| Wet Pick (Huber Ink No. 3) | 43 | 32 | 41 | 10 |
| Ink Transfer (%) | 44 | 56 | 47 | 71 |
| Ink Refusal (%) | 12 | 12 | 12 | 19 |
| Pigment Composition B | | | | |
| Dry Pick | 61 | 76 | 69 | 77 |
| Wet Pick (Huber Ink No. 4) | 18 | 6 | 17 | 7 |
| Ink Transfer (%) | 66 | 79 | 67 | 80 |
| Ink Refusal (%) | 16 | 15 | 16 | 13 |

*Comparative experiment, not an example of the present invention.
**In order to achieve sufficient stability of the formulation, 1.5 weight parts of Aerosol A-102 anionic surfactant was additionally required for experiments 12 and 14.

We claim:

1. A (meth)acrylate polymer consisting essentially of in polymerized form:

(a) from 20 to 61.5 parts by weight of styrene,
(b) from 38.5 to 78.5 parts by weight (meth)acrylate monomer(s),
(c) from 0.2 to 6 parts by weight of at least one ethylenically unsaturated carboxylic acid and
(d) from 0.5 to 5 parts by weight of at least one sulfoalkyl surfactant monomer of the formula:

$$H_2C=C(R_1)-C(O)-O-R_2-SO_3-M \qquad I$$

wherein $R_1$ is —H or a methyl radical, $R_2$ is a bivalent hydrocarbyl radical having 1 to 5 carbon atoms and M is a salt-forming cation, said weight parts being based on 100 weight parts (a), (b), (c) and (d).

2. A polymer according to claim 1 in the form of an aqueous latex dispersion.

3. A polymer according to claims 1 or 2 wherein component (d) is sulfoethyl(meth)acrylate or sulfopropyl(meth)acrylate.

4. A polymer according to any claim 3 wherein component (d) is sulfopropyl methacrylate (SPM).

5. A polymer according to claim 1 wherein component (c) is methacrylic acid.

6. A polymer according to claim 1 comprising in polymerized form from 20 to 60 parts by weight styrene as component (a).

7. A polymer according to claim 1 wherein component (b) is n-butyl acrylate or ethyl hexylacrylate.

8. A polymer according to claim 1 comprising in polymerized form (a) from 20 to 60 parts by weight styrene, (b) from 38.5 to 78.5 parts by weight n-butyl acrylate, (c) from 0.5 to 3 parts by weight methacrylic acid and (d) from 1 to 3 parts by weight SPM.

9. An aqueous coating formulation containing a polymer according to claim 1.

* * * * *